United States Patent
Haugh et al.

(10) Patent No.: US 9,612,716 B2
(45) Date of Patent: Apr. 4, 2017

(54) ENHANCED SLIDER BAR SYSTEM

(75) Inventors: Julianne Frances Haugh, Austin, TX (US); Christopher J. Tan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1318 days.

(21) Appl. No.: 12/612,439

(22) Filed: Nov. 4, 2009

(65) Prior Publication Data

US 2011/0107259 A1    May 5, 2011

(51) Int. Cl.
G06F 3/14    (2006.01)
G06F 3/0482    (2013.01)

(52) U.S. Cl.
CPC .................................. *G06F 3/0482* (2013.01)

(58) Field of Classification Search
CPC .... G06F 3/0485; G06F 3/0482; G06F 3/0488; G06F 3/04842; G06F 3/04883
USPC ......................................... 715/784, 785, 786
See application file for complete search history.

(56) References Cited

U.S. PATENT DOCUMENTS

| | | | |
|---|---|---|---|
| 5,872,566 A | 2/1999 | Bates | |
| 5,874,961 A | 2/1999 | Bates | |
| 5,999,176 A | 12/1999 | Kamper | |
| 2003/0122874 A1 | 7/2003 | Dieberger | |
| 2008/0253737 A1* | 10/2008 | Kimura et al. | 386/68 |
| 2010/0088637 A1* | 4/2010 | Liu | 715/810 |
| 2010/0211908 A1* | 8/2010 | Luk et al. | 715/786 |

OTHER PUBLICATIONS

Glazebrook (hereinafter Glazebrook), Advanced jQuery Tabbed Box Techniques (Jan. 25, 2009). http://www.cssnewbie.com/advanced-jquery-tabbed-box-techniques/.*
Elizabeth Gregory, Summary, Tips, and Tricks on Introduction to LabVIEW (Aug. 12, 2004). http://cnx.org/content/m12203/latest/. With regard to Claim 4 and 12 and 20.*
Steve Johnson, Microsoft® Windows Vista® on Demand, Second Edition (Mar. 19, 2008).*
paranoid-androids.com, Tab Groups (Feb. 17, 2007). http://web.archive.org/web/20070217040933/http://paranoid-androids.com/tabgroups/.*

* cited by examiner

*Primary Examiner* — Di Xiao
(74) *Attorney, Agent, or Firm* — David A. Mims, Jr.; Damion Josephs; Robert V. Wilder

(57) ABSTRACT

A method, programmed medium and system are provided for enabling a slider bar to change "mode" or "purpose", based on feedback from the graphical user interface (GUI). In one exemplary embodiment, a slider functions in usual manner but an audible or video signal is provided as each tab, window or object in a plurality of tabs, windows or objects is scrolled through. Within a specific time interval of feedback action, the user may stop and pause the movement of the cursor. This causes the tab, window or object to open and the slider bar mode to change from selecting to scrolling through the content of that specific tab, window or object. In another example, in addition to the "pause" action, the enhanced slider bar would accept movement perpendicular to the normal direction of slider bar movement, as indication that a new function is to be performed.

18 Claims, 3 Drawing Sheets

ENHANCED SLIDER BAR SYSTEM

FIELD OF THE INVENTION

The present invention relates generally to information processing systems and more particularly to a an improved user input selection methodology and system for use in computerized devices.

BACKGROUND OF THE INVENTION

Slider bars are operated with a mouse or other user input device which typically involves selecting and dragging the bar. Once the bar has been dragged to a certain location in a tabbed collection of sub-objects, such as pages in a tabbed collection of pages within a spreadsheet, the user must move the mouse pointer, click, etc. to raise the tab, then begin operating within the now raised or selected tab. Common organization methods for collections of objects or information cause the user to be required to select from a plurality of sub-object categories within a more general category or tab. This organization causes the requirement to repeat the slider bar movement, selection click, and repositioning of the input device for a new slider bar movement in a repetitive cycle.

Horizontal and vertical slider bars are a convenient mechanism for operating within a graphical user environment. They have numerous applications, such as viewing multiple pages within a spreadsheet, selecting time-based data from a time series of data objects, or selecting among multiple objects within a plurality of objects which may be viewed in some form of table. As the complexity of the data increases, however, the need may arise for nested slider bars, such as a slider bar which selects displayable objects or windows from a plurality of objects or windows, and a second slider bar which scrolls the data within that object or window. Such nested slider bars can create clutter and reduce the amount of viewable space.

Therefore, it would be advantageous to have a slider bar, either horizontal or vertical, which was able to change "mode" or "purpose", based on the user's behavior and feedback from the graphical user interface.

SUMMARY OF THE INVENTION

A method, programmed medium and system are provided for enabling a slider bar to change "mode" or "purpose", based on the user's behavior and feedback from the graphical user interface (GUI). In an exemplary embodiment, the slider functions in usual manner but an audible or video signal is provided as each tab, window or object in a plurality of tabs, windows or objects is scrolled through. Examples of audio or video signals include, inter alia, flashing, blinking and/or buzzing. Within a specific time interval of feedback action, the user may stop and pause the movement of the cursor. This causes the tab, window or object to open and the slider bar mode to change from selecting between tabs, windows or objects to scrolling through the content of that specific tab, window or object. In another example, in addition to the "pause" action, which would be a time-dependent feedback, the enhanced slider bar would accept movement perpendicular to the normal direction of slider bar movement, as indication that the time-dependent "pause" was being overridden and the selection of a new level of "depth" should be performed immediately. Such perpendicular movements of the mouse pointer may include "deeper" or "shallower", such that the entire hierarchy of tabs, windows or objects might be navigated without resorting to moving the mouse from navigation element to navigation element. In still another example, the slider bar is able to display a temporary indicator to prompt perpendicular "up" or "down" movements with a visible system such as a transparent pair of arrows or other GUI element.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
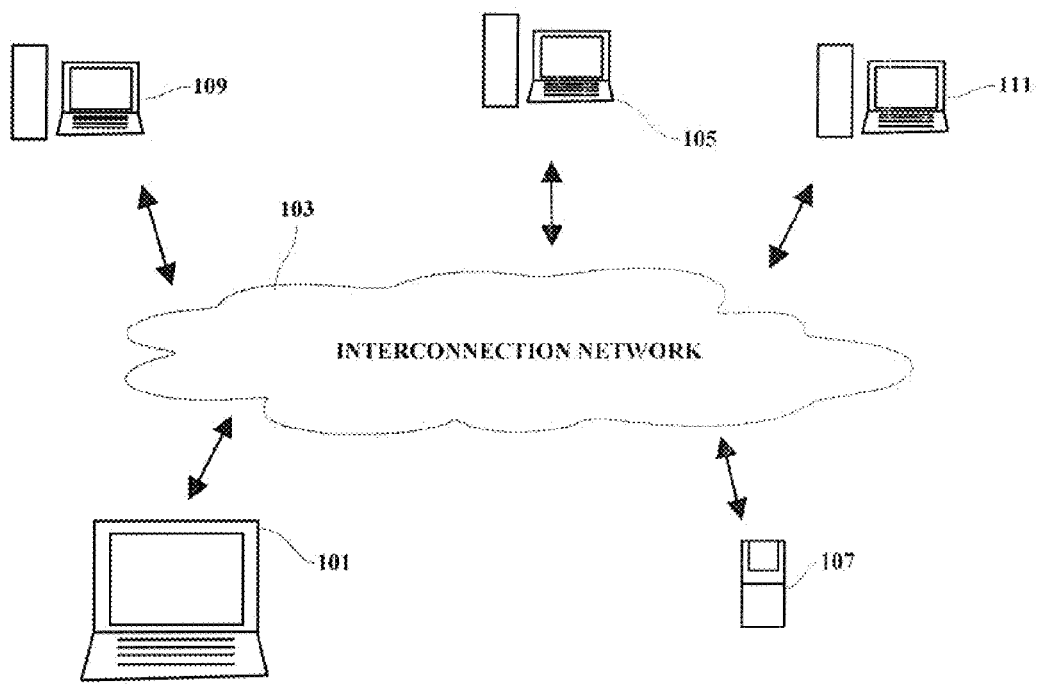
FIG. 1 is an illustration of one embodiment of a system in which the present invention may be implemented.

The various methods discussed herein may be implemented within a computer system which includes processing means, memory, storage means, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a networked computer system using a laptop computer or other portable device, it is understood that disclosed methodology may also be applied in many other available and future devices and systems such as cell phones and personal wireless and other hand-held devices which may implement any of many available input systems including but not limited to touch-sensitive screens or touch-sensitive input pads, to achieve the beneficial functional features described herein.

In an exemplary embodiment, a graphical user interface system, such as Java Swing classes, would allow a traditional slider bar be defined with an additional set of properties, and from those additional properties would be generated additional events. These events would then trigger the application such that the application will change the internal interpretation of the slider bar until such time as another mode changing event occurred.

As used herein, a slider bar is a graphical user interface element consisting of an object which moves in a single dimension, either horizontally or vertically. The position of the slider bar is used to control various elements within the GUI application. A tab is one of a plurality of graphical entities, often represented as a "tab" in a traditional index card box wherein different cards have different "tabs". A "tab" may be a traditional "tab"-type graphical object, or one of a plurality of other indicia or objects (such as pages), or one of a plurality of data streams. The disclosed system is not limited to the type of high level object being selected by the slider bar. The purpose of the time interval in the present disclosure is to allow the slider to continue to function in the usual manner should movement of the slider continue during a predetermined time interval. At the start of the time interval a feedback action would be performed, i.e. an audio and/or video signal such as a "beep"; "flash", "blink", or "buzz" or similar alerting action, and the user would be able to stop the slider motion. Should the motion of a cursor or pointer stop during a predetermined interval after the cursor enters a tab area on a display screen, and remain stopped during the time interval, the "mode" of the slider bar would change and a different set of events, indicating the mode change of the slider bar, would be implemented.

The purpose of the "feedback action" as herein described, is to notify the user of the start of the timeout period, during which period the user must cease movement of the slider bar in order for the mode to change. This feedback action should be user-configurable so that the feature may be used by persons with varying skills and physical abilities. For example, choices or settings of aural, visual and tactile feedback as well as the time duration of the feedback period and sensitivity of cursor movement may be pre-set by the user through an implementation of a "settings" user input screen.

As noted above, the time interval determines the beginning of a timeout period, during which time the user must cease movement in order to select the new mode of the slider. As an alternative, and to allow the user to save time, a perpendicular movement of the pointer device (mouse, trackball, etc.) is permitted such that a perpendicular movement of the cursor would force the time interval to end, and the mode to change. Bi-directional perpendicular movement is supported in this mode such that changes in hierarchy are possible by such perpendicular cursor movements. Thus, upon activating the slider bar, the user may move the pointer "backwards" and go to a "higher level" within a hierarchy of "levels" of meaning for the slider bar.

Although this disclosure is defined in terms of "bimodal" behavior, the number of. "levels" which may be applied to the slider is not limited to two. For example, if a business catalog included a single vertical slider bar at one edge, and the "top level" menu includes the letters, A-Z, for each of the business's products, as the user scrolls downwardly, the graphical interface emits a series of clicks when each letter in the range A-Z is displayed. The letter is highlighted for the duration of the interval, "sticking" on that letter. When the desired letter is found, the user makes a quick perpendicular movement towards the letter, thereby opening a list of products that have the desired initial letter. With this listing displayed, the user may continue the vertical scrolling movement with each product being highlighted during the time interval after the feedback "click" is produced. When the desired product is again indicated, a perpendicular movement toward the product is made, thereby opening a list of products within the product family—for example, types of light bulbs, by wattage or type of bulb. This continues, scrolling up and down through various product types, vendors, etc, all without having to remove the pointer from the singular slider bar, such as to explained a hierarchical tree of objects, change sliders, click on products, types, vendors etc. Traversing "upwardly" in the hierarchy is achieved by grabbing the slider with the pointer and making a perpendicular movement away from the object.

FIG. 1 illustrates an exemplary environment in which the present invention may be implemented. The present invention may be implemented within a stand-alone application or in a server application which is accessed through an interconnection network such as the Internet. As shown, a user terminal 101, which may be a laptop computer, is connected through an interconnection network 103, such as the Internet, to a server 105. The server 105 may also be accessed from cell phones and other personal wireless devices 107 including devices with screen-sensitive input and/or display systems. Server 105 may be accessed by the user unit 101 to download or access one or more applications for use and/or input at the user terminal 101/107, and any information input by the user may be uploaded back to the server 105. Server 105 in the example, and/or a user device 101 or 107, is coupled through the network 103 to other information or news service servers 109 and 111 to access information to selectively display in an application running on user devices 101 and 107.

Figure 2:
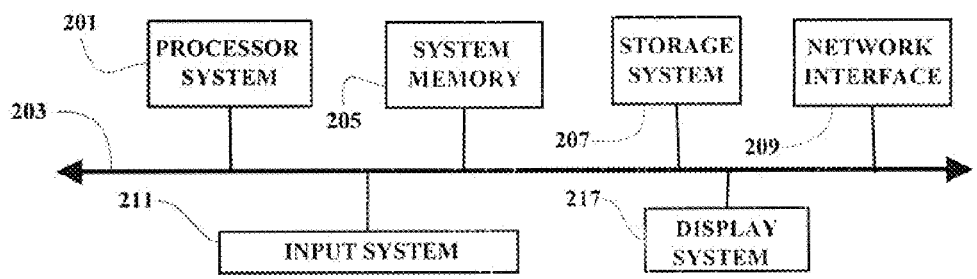
FIG. 2 is a block diagram showing several of the major components of an exemplary system or device using the present invention.

FIG. 2 illustrates several of the major components of a computer system which may be used to implement the present invention. As shown, a processor system 201 is connected to a main bus 203. The main bus 203 is also coupled to, inter alia, system memory 205, a local storage system 207, a network interface 209, an input system 211 which may include, inter alia, connections to a keyboard or keypad and a mouse or pointing device. The main bus is also connected to a display system 217. The input and/or display system may also comprise a touch-sensitive screen or optically-sensitive input pad (not shown).

Figure 3:
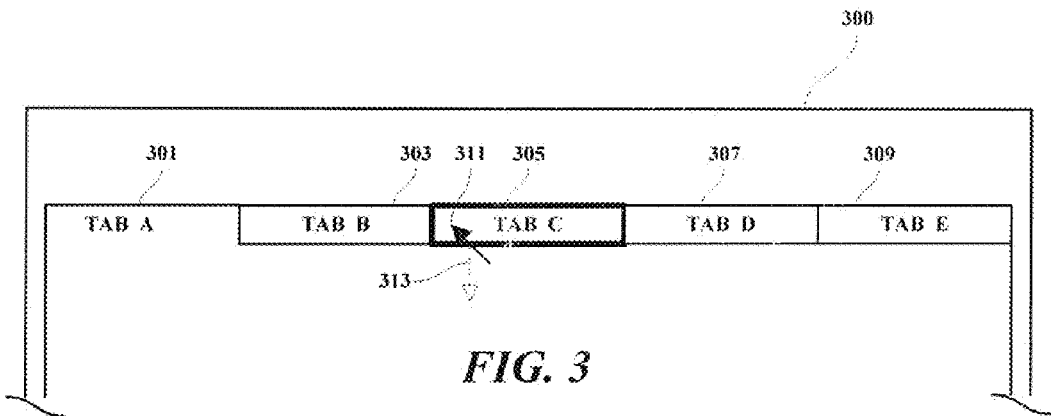
FIG. 3 is an illustration of an exemplary screen display useful in explaining an operation of the present invention.

In FIG. 3, an illustrated display screen 300 shows a portion of an exemplary application which is used to show several of the features of the disclosed methodology. As shown, the example shows a computer application for purchasing merchandise which includes a hierarchy of tabbed sections presented to a user to aid in selecting particular merchandise which may be purchased. In the example, the application is running on a store catalog server which is accessed by a user of a computerized device, such as a laptop computer 101 or wireless device 107, over an interconnection network 103 such as the Internet. The display screen 300 shows a plurality of indicia, i.e. Tabs A-E, 301-309 respectively, which may stand for different categories of products being offered for sale. Such categories may include, for example, garden products, household products, hardware products, auto products, etc. When a user chooses to run the disclosed Automatic Tab Display process to display items in indicium Tab C 305, the user will select Tab C 305 by pointing the cursor 311 to Tab C 305 and actuating the pointer or mouse switch. At that time, each of the tabs is highlighted in sequence for a predetermined period of time "T". The user is then enabled to select Tab C 305 by moving the cursor in a direction perpendicular to the line of Tabs 301-309 as shown 313 when the particular Tab of interest is highlighted. Other means of actuating the select function may also be implemented. The means of highlighting may take any visual and/or audio form such as, for example, an audio tone and/or a flashing of the displayed Tab being highlighted. When Tab C 305 for example, is selected during a highlight time period when Tab C is highlighted, the display changes to that shown in FIG. 4 where the subset of items under selected TAB C 305 is presented.

Figure 4:
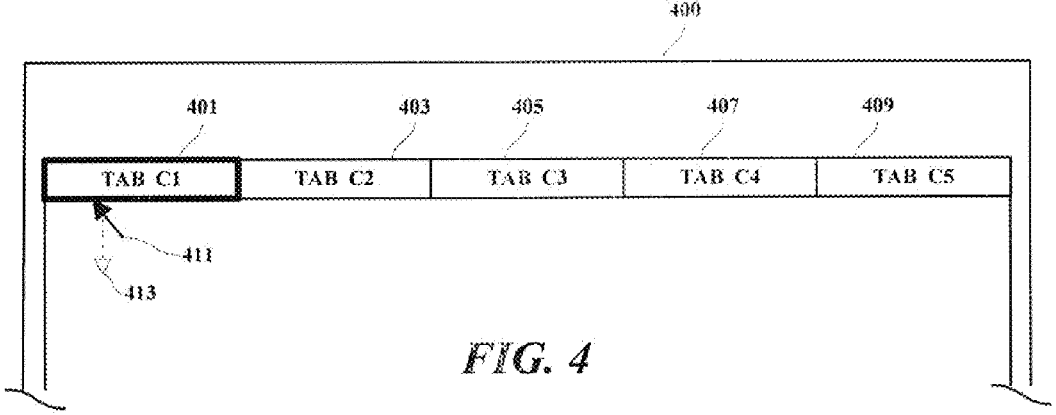
FIG. 4 is another illustration of an exemplary screen display useful in explaining an operation of the present invention.

For example, if Tab C 305 represented a "Clothing" category, the subset displayed in FIG. 4 display 400 may include "Men's Clothing", "Women's Clothing", "Children's Clothing", etc., as Tabs C1-C5, 401-409, respectively. When the screen shown in FIG. 4 is presented, each of the sub-tabs C1-C6 will be highlighted in sequence for the predetermined time period during which the user may select a preferred sub-tab C1-C6. In a manner similar to that used to select Tab C, one of the subset Tabs 401-409 may be selected to further narrow the search for a particular item in the selected subset. For example, Tab C1 401 may be selected by the user by moving the pointer 411 in a direction perpendicular 413 to the line of Tabs shown in FIG. 4 as Tab C1 is being highlighted. This action will cause the subset of Tabs as shown in FIG. 5 to be presented.

Figure 5:
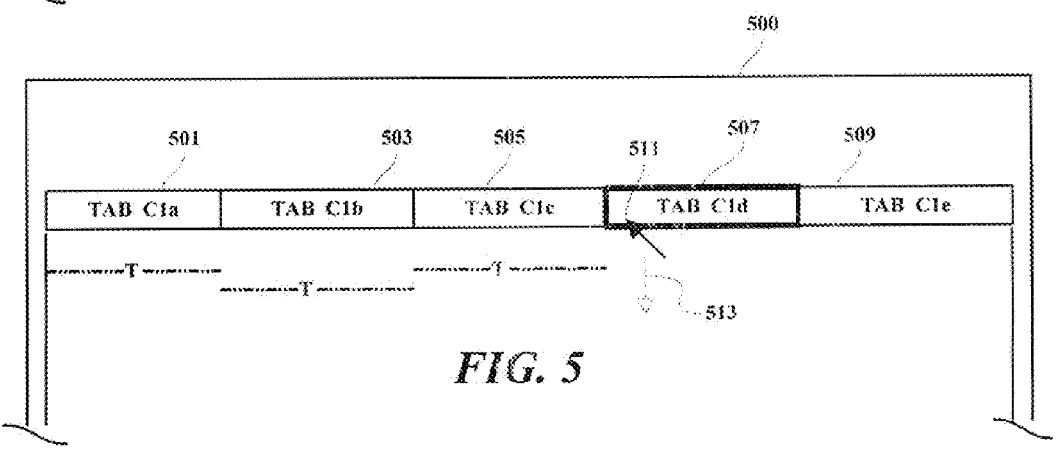
FIG. 5 is an illustration of an exemplary screen display useful in explaining an operation of the present invention.

In the example, if Tab C1 is "Men's Clothing", the Tabs C1*a*-C1*e* 501-509 shown the in FIG. 5 screen display 500 may represent different types of "Men's Clothing". Again, when Tab C1 was selected, screen display 500 will be presented and each of the Tabs C1*a*-C1*e* 301-509 will be sequentially highlighted for the pre-set select time "T". During this sequence, the user need not move the cursor to select a Tab. The cursor in an exemplary embodiment could automatically move along with the highlighted Tab to facilitate the perpendicular selection movement by the user. The user is enabled to merely move the cursor 511 in a direction perpendicular to 513 the Tab line of Tabs C1*a*-C1*e* when the Tab of interest to the user is being highlighted.

Figure 6:
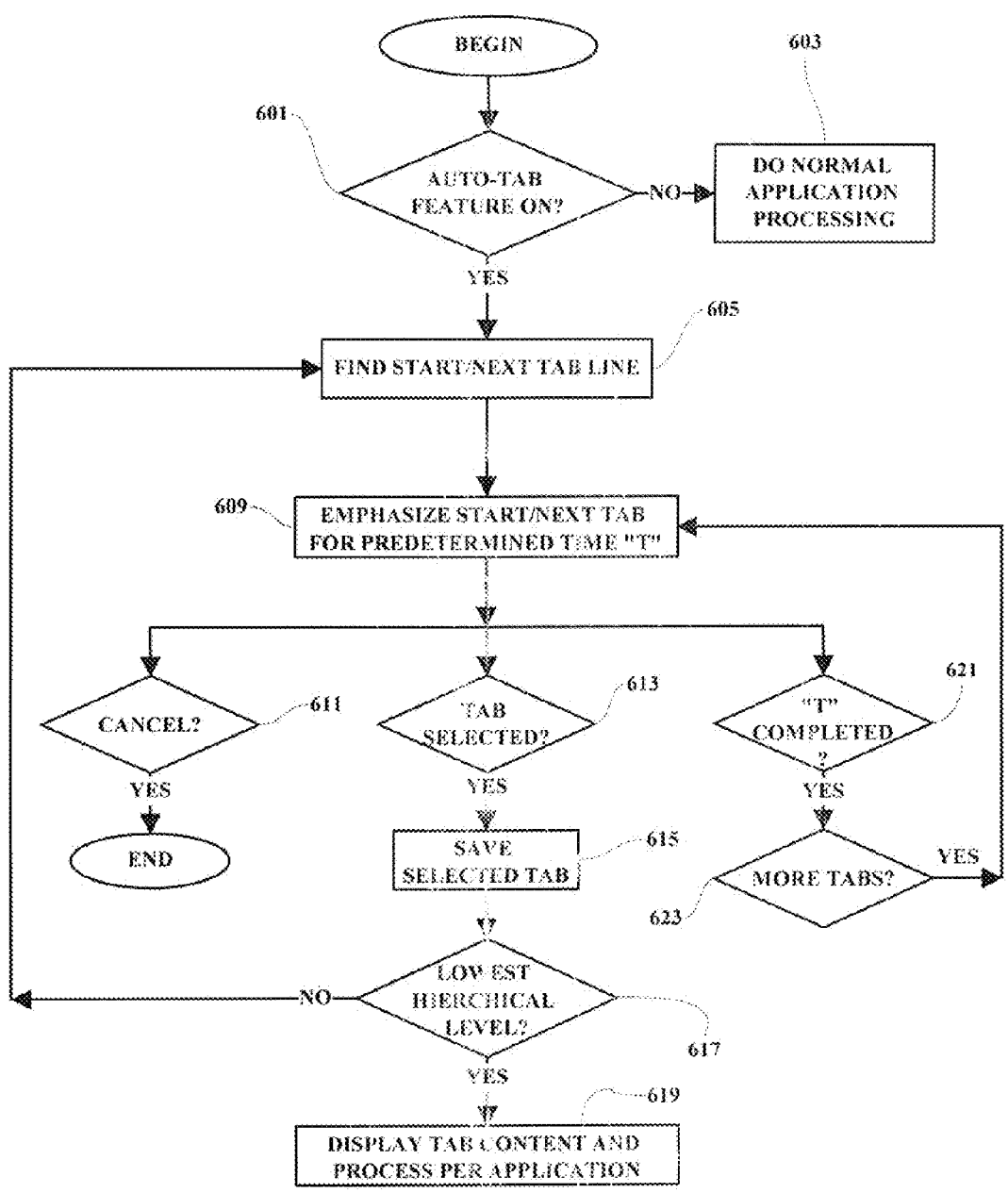
FIG. 6 is a flow chart illustrating an exemplary sequence of operations which may be implemented in accordance with the present invention.

An exemplary sequence of operation of the disclosed methodology is illustrated in the flow chart of FIG. 6. As shown, the process begins by checking to see if the tab auto-scrolling display function has been selected 601. The user is enabled to not select this feature in which case the application will perform normal application processing 603 in which the user is required to manually move the pointer/cursor to a Tab and then click on the tab and again manually move the pointer/cursor to the next tab to be selected and again click or actuate the pointer/cursor button or switch. However, if the user has turned the tab auto-scrolling feature ON 601, an initial tab row or tab line is located 605 on the display. The default start tab for beginning the highlighting sequence may be the leftmost tab displayed on the tab line for example.

In another example, if auto-scroll or tab auto-scrolling is not pre-selected, a user may activate the tab auto-scrolling or auto-scroll feature if, within a specific time interval of feedback action "T", the user stops and pauses the movement of the cursor, which would cause the tab, window or object to open and the slider bar mode to change from selecting to scrolling through the content of that specific tab, window or object. Thus, in addition to the "pause" action, the enhanced slider bar may be programmed to accept movement perpendicular to the normal direction of slider bar movement or tab line, as an indication that a new function, e.g. tab auto-scrolling, is to be performed.

Next, as shown in FIG. 6, beginning with the start tab (or the next tab in a return operation 617, 623), the displayed tabs will be sequentially highlighted or emphasized 609 for a pre-set or pre-determined time period "T". The user is enabled to cancel the operation 611 which will end the tab auto-scrolling display process. The tab auto-scrolling feature may be terminated or cancelled by any of many available processes including clicking on a "Cancel" icon on the display screen or merely clicking the cursor on an inactive screen area.

When the user selects a Tab 613 while the selected Tab is being highlighted, and the selected Tab will be saved for reference 615. It will then be determined whether the selected Tab is the lowest hierarchical level 617 in the particular application, i.e. determine if there are any sub-tabs available for the selected tab. If the selected tab is at the lowest hierarchical level and there are no sub-tabs available 617 then the tab content is displayed 619, which may include a listing of individual specific items offered for sale, and the user is enabled to select an item for purchase and proceed with the particular catalog application. If the selected tab is not the lowest hierarchical level 617 and there are more tab lines available to even further specify categories of items for selection rather than specific items, then the process returns to display the next tab line 605 and continues as described above. If the user does not select a highlighted or emphasized tab before the selection time T for a particular tab expires 621, and there are more tabs in the tab line 623, then the process returns to highlight the next tab in sequence.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing a selection of a displayed indicium, said displayed indicium being one of a plurality of displayed indicia being presented on a display screen, said method comprising:

determining an order for said plurality of displayed indicia;

differentiating each of said displayed indicia from others of said plurality of displayed indicia in sequence, said differentiating being effective for a predetermined time period for each of said plurality of displayed indicia; and enabling a selection of one of said plurality of displayed indicia in response to only a single movement of a displayed pointer during said predetermined time period when a selected one of said plurality of displayed indicia is being differentiated from others of said plurality of displayed indicia, said displayed indicia being disposed along a given axis on said display screen, said selecting being accomplished by moving said displayed pointer in a direction perpendicular to said given axis when a selected one of said plurality of displayed indicia is being differentiated from others of said plurality of displayed indicia.

2. The method as set forth in claim 1 wherein said displayed pointer is moved by a movement of a mouse device.

3. The method as set forth in claim 2 wherein said selection is accomplished solely through movement of said screen pointer during said predetermined time period when a selected one of said plurality of displayed indicia is being differentiated from others said plurality of displayed indicia.

4. The method as set forth in claim 1 wherein said differentiating is a visual differentiation.

5. The method as set forth in claim 1 wherein said differentiating is an audio differentiation.

6. The method as set forth in claim 1 wherein said differentiating is accomplished using both video and audio effects.

7. The method as set forth in claim 1 wherein said plurality of displayed indicia comprise a first level of a hierarchy of displayed indicia, each of said displayed indicia being selectable to display a second level of displayed indicia in said hierarchy of displayed indicia.

8. A computer-readable, non-transitory storage device(s) and computer-readable program instructions stored on the computer-readable, non-transitory storage device(s) for processing of a selection of a displayed indicium, said displayed indicium being one of a plurality of displayed indicia being presented on a display screen, the computer-readable program instructions, when executed by a processing system, being operable for implementing a method comprising:

determining an order for said plurality of displayed indicia;

differentiating each of said displayed indicia from others of said plurality of displayed indicia in sequence, said differentiating being effective for a predetermined time period for each of said plurality of displayed indicia; and enabling a selection of one of said plurality of displayed indicia in response to only a single movement of a displayed pointer during said predetermined time period when a selected one of said plurality of displayed indicia is being differentiated from others of said plurality of displayed indicia, said displayed indicia being disposed along a given axis on said display screen, said selecting being accomplished by moving said displayed pointer in a direction perpendicular to said given axis when a selected one of said plurality of displayed indicia is being differentiated from others of said plurality of displayed indicia.

9. The computer-readable, non-transitory storage device(s) as set forth in claim 8 wherein said displayed pointer is moved by a movement of a mouse device.

10. The computer-readable non-transitory storage device(s) as set forth in claim 9 wherein said selection is accomplished solely through movement of said screen pointer during said predetermined time period when a selected one of said plurality of displayed indicia is being differentiated from others of said plurality of displayed indicia.

11. The computer-readable non-transitory storage device(s) as set forth in claim 8 wherein said differentiating is a visual differentiation.

12. The computer-readable, non-transitory storage device(s) as set forth in claim 8 wherein said differentiating is an audio differentiation.

13. The computer-readable, non-transitory storage device(s) as set forth in claim 8 wherein said differentiating is accomplished using both video and audio effects.

14. The computer-readable, non-transitory storage device(s) as set forth in claim 8 wherein said plurality of displayed indicia comprise a first level of a hierarchy of displayed indicia, each of said displayed indicia being selectable to display a second level of displayed indicia in said hierarchy of displayed indicia.

15. A system for effecting a processing of a selection of a displayed indicium, said displayed indicium being one of a plurality of displayed indicia being presented on a display screen, said system comprising:

a processor and a memory;

a processing system that determines an order for said plurality of displayed indicia;

said processing system being operable for differentiating each of said displayed indicia from others of said plurality of displayed indicia in sequence, said differentiating being effective for a predetermined time period for each of said plurality of displayed indicia; and a selection device that enables a selection of one of said plurality of displayed indicia in response to only a single movement of a displayed pointer during said predetermined time period when a selected one of said plurality of displayed indicia is being differentiated from others of said plurality of displayed indicia, said displayed indicia being disposed along a given axis on said display screen, said selecting being accomplished by moving said displayed pointer in a direction perpendicular to said given axis when a selected one of said plurality of displayed indicia is being differentiated from others of said plurality of displayed indicia.

16. The system as set forth in claim 15 wherein said displayed pointer is moved by a movement of a mouse device.

17. The system as set forth in claim 16 wherein said selection is accomplished solely through movement of said screen pointer during said predetermined time period when a selected one of said plurality of displayed indicia is being differentiated from others of said plurality of displayed indicia.

18. The system as set forth in claim 17 wherein said differentiating is accomplished using video and/or audio effects, and wherein said plurality of displayed indicia comprise a first level of a hierarchy of displayed indicia, each of said displayed indicia being selectable to display a second level of displayed indicia in said hierarchy of displayed indicia.

* * * * *